(12) United States Patent
Combs et al.

(10) Patent No.: US 11,972,581 B2
(45) Date of Patent: Apr. 30, 2024

(54) DETERMINING A GEOLOGICAL CORRELATION WITH A WELLBORE POSITION

(71) Applicant: Halliburton Energy Services, Inc., Houston, TX (US)

(72) Inventors: Jeremy James Combs, Spring, TX (US); William David Bethancourt, Houston, TX (US); Renata Da Gama Saintive, Houston, TX (US); Clinton Keith Bates, Kingwood, TX (US); Robert Grant Gillson, III, Fort Smith, AR (US)

(73) Assignee: Halliburton Energy Services, Inc., Houston, TX (US)

( * ) Notice: Subject to any disclaimer, the term of this patent is extended or adjusted under 35 U.S.C. 154(b) by 514 days.

(21) Appl. No.: 17/203,299

(22) Filed: Mar. 16, 2021

(65) Prior Publication Data

US 2021/0327077 A1 Oct. 21, 2021

Related U.S. Application Data

(60) Provisional application No. 63/011,006, filed on Apr. 16, 2020.

(51) Int. Cl.
*G06T 3/14* (2024.01)
*E21B 7/04* (2006.01)
(Continued)

(52) U.S. Cl.
CPC ............... *G06T 7/30* (2017.01); *E21B 44/00* (2013.01); *G06T 3/067* (2024.01); *G06T 2207/30181* (2013.01)

(58) Field of Classification Search
CPC .............. E21B 44/00; G06T 3/0037; G06T 2207/30181; G06T 7/30
See application file for complete search history.

(56) References Cited

U.S. PATENT DOCUMENTS 7,925,483 B2 * 4/2011 Xia ..................... G01V 1/34
367/72
10,295,691 B2 5/2019 Gorban et al.
(Continued)

FOREIGN PATENT DOCUMENTS

WO 2016077731 A1 5/2016

OTHER PUBLICATIONS

P. L. Rosin and G. A. W. West, "Nonparametric segmentation of curves into various representations," in IEEE Transactions on Pattern Analysis and Machine Intelligence, vol. 17, No. 12, pp. 1140-1153, Dec. 1995, doi: 10.1109/34.476507. (Year: 1995).*

*Primary Examiner* — Bobbak Safaipour
*Assistant Examiner* — Ashley L. Hytrek
(74) *Attorney, Agent, or Firm* — Benjamin Ford; Parker Justiss, P.C.

(57) ABSTRACT

This disclosure presents a process to determine an alignment parameter for geosteering a wellbore undergoing drilling operations. The process can receive one or more azimuthal image log data sets, one or more geology logs, and other input parameters. The image log data sets can be transformed to better approximate the geology logs, such as transforming a 3D representation to a 2D representation and flattening out curves represented in the original image log data. The geology logs or transformed image log data can then be moved to create an approximate alignment between the other log data. The movement, which can be a sliding movement, a linear movement, a tilting movement, an angling movement, or a rotating movement, can be used to determine the determined alignment parameter or final (Continued)

alignment parameter. The alignment parameter can be used as input into a geosteering system for the wellbore.

21 Claims, 6 Drawing Sheets

(51) Int. Cl.
*E21B 44/00* (2006.01)
*E21B 47/09* (2012.01)
*G06T 3/067* (2024.01)
*G06T 7/30* (2017.01)

(56) References Cited

U.S. PATENT DOCUMENTS

| | | | |
|---|---|---|---|
| 10,564,109 B1* | 2/2020 | Al Ismail | G01N 33/24 |
| 2014/0291024 A1 | 10/2014 | Sugiura et al. | |
| 2015/0276966 A1* | 10/2015 | Wang | G01V 3/38 |
| | | | 702/7 |
| 2015/0279093 A1* | 10/2015 | Sung | E21B 47/002 |
| | | | 345/419 |
| 2017/0108606 A1* | 4/2017 | Gorban | G01V 3/38 |
| 2019/0093470 A1 | 3/2019 | Ma et al. | |
| 2020/0074588 A1* | 3/2020 | Fouda | G06T 3/4038 |
| 2021/0124082 A1* | 4/2021 | Wang | G01V 3/30 |

* cited by examiner

DETERMINING A GEOLOGICAL CORRELATION WITH A WELLBORE POSITION

CROSS-REFERENCE TO RELATED APPLICATION

This application claims the benefit of U.S. Application Ser. No. 63/011,006, filed by Jeremy James Combs, et al. on Apr. 16, 2020, entitled "DETERMINING A GEOLOGICAL CORRELATION WITH A WELLBORE POSITION," which is commonly assigned with this application and incorporated herein by reference in its entirety.

BACKGROUND

When developing and drilling wellbores for hydrocarbon production, it is important to be able to position the wellbore where desired proximate the surrounding geology of the subterranean formation. The well operation plan may specify that the wellbore should be located along a dip or a specified distance from a dip. In this scenario, as the dip changes across the subterranean formation, the wellbore would need to follow similar changes. A more efficient way for geosteering the drilling of the wellbore would be beneficial to maintain an appropriate orientation and distance to the changing dip.

SUMMARY

On one aspect, a method is described. In one embodiment the method includes (1) identifying a location at which a wellbore is compared to geology logs, wherein the location is in a subterranean formation of the wellbore; (2) collecting an initial image log data set, wherein the initial image log data set represents a 3D image proximate the wellbore at the location; (3) transforming the initial image log data set to match an orientation of the geology logs, to generate a transformed image log data set; (4) overlaying the transformed image log data set on the geology logs to generate an overlaid image log data set; and (5) determining an alignment parameter, wherein the geology logs or the overlaid image log data set is adjusted.

On one aspect, a system is described. In one embodiment the system includes (1) an image log data transceiver, capable of receiving input parameters and one or more image log data sets for a location proximate a wellbore, wherein the location is a part of a subterranean formation; (2) a geology log transceiver, capable of receiving one or more geology logs for the location; and (3) an alignment adjustor, capable of utilizing the input parameters, the one or more image log data sets, and the one or more geology logs to calculate one or more alignment parameters, wherein the one or more image log data sets are transformed to match an orientation of the one or more geology logs, and the one or more image log data sets are compared to the respective of the one or more geology logs to calculate the one or more alignment parameters.

On one aspect, a computer program product having a series of operating instructions stored on a non-transitory computer-readable medium that directs a data processing apparatus when executed thereby to perform operations to determine an alignment parameter is described. In one embodiment, the computer program product operations include (1) identifying a location at which a wellbore is compared to geology logs, wherein the location is in a subterranean formation of the wellbore; (2) collecting an initial image log data set, wherein the initial image log data set represents a 3D image proximate the wellbore at the location; (3) transforming the initial image log data set to match an orientation of the geology logs to generate a transformed image log data set; (4) overlaying the transformed image log data set to the geology logs to generate an overlaid image log data set; and (5) determining an alignment parameter, wherein the geology logs or the overlaid image log data set is adjusted.

BRIEF DESCRIPTION

Reference is now made to the following descriptions taken in conjunction with the accompanying drawings, in which.

DETAILED DESCRIPTION

In the hydrocarbon production industry, users, such as well operators or engineers, use geosteering techniques to maintain wellbore development, e.g., drilling operations, along an intended path and direction. As the geological features, e.g., dips, change along a subterranean formation, the direction and depth of the wellbore can change to maintain its relative positioning. The conventional process for correlating wellbore logs to real-time geological data can be time consuming. In addition, correlating the wellbore logs can be iterative and involve repetitive calculations.

This disclosure presents a process that can improve a user's understanding of the geology proximate the wellbore by using azimuthal images to analyze changes of the geology near the wellbore. The analyzation can be done visually using a colorization or symbolization of the dips and other subterranean formation features. In other aspects, the analyzation can be done by a computing system using the collected data values.

Figure 1:
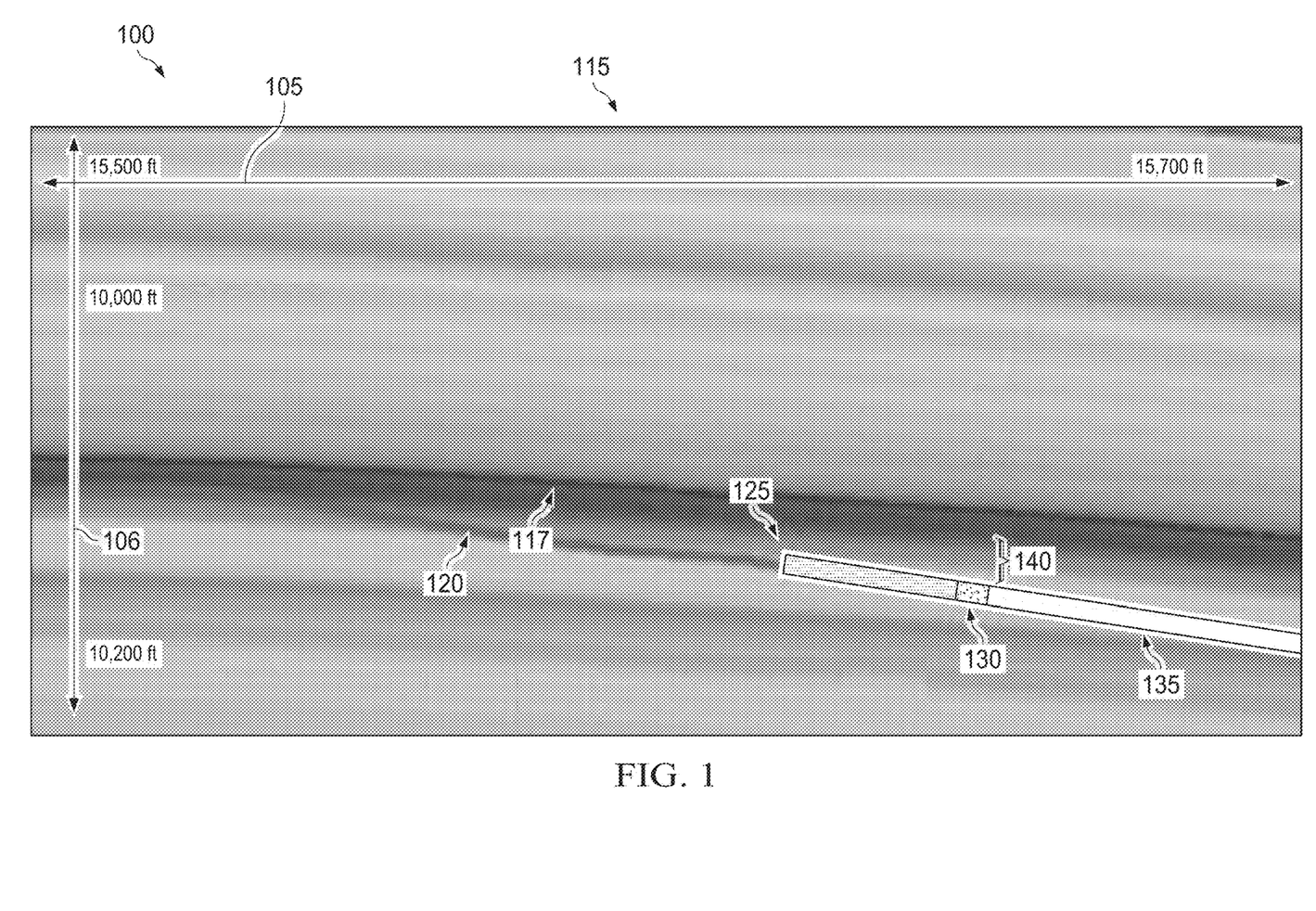
FIG. 1 is an illustration of a diagram of an example wellbore geosteering state.

Turning to the figures, FIG. 1 is an illustration of a diagram of an example wellbore geosteering state 100 in a subterranean formation 115. Subterranean formation 115 is located, for example, at a measured depth 105 between approximately 15,500 feet to 15,700 feet and a total vertical depth 106 between approximately 10,000 feet and 10,200 feet, where measured depth is the depth along the length of the borehole. Subterranean formation 115 has a dip 117 (shown as dark bands) to which a wellbore 120 should maintain a specified distance. As dip 117 angles down to the right, the drilling of wellbore 120 should mimic the downward angle to maintain the specified separation distance. A last survey point 125 (shown as a solid black rectangle portion of wellbore 120) is the last position where the image log data has been collected. The image log data can be used in conjunction with offset geology logs to determine adjustments to the geosteering process.

At the end of wellbore 120 is a downhole tool 130 (shown as a striped rectangle) including a drilling tool, e.g., drill bit. A projected drill path 135 (shown as an outlined rectangle) shows the current projected path of wellbore 120 if further geosteering adjustments are not made. Bracket 140 is highlighting an approximate depth difference between wellbore 120 and dip 117. The disclosed processes herein can compute the difference as highlighted by bracket 140 and use that difference as an alignment parameter input into a geosteering process. This example demonstrates a change in depth difference between dip 117 and wellbore 120. The computed difference, and the resulting alignment parameter, can be a linear movement in various directions, as well as a tilt movement, a rotation movement, a slide movement, or an angle movement.

Figure 2A:
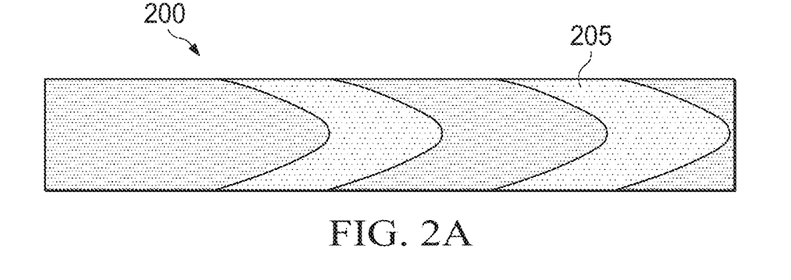
FIG. 2A is an illustration of a diagram of an example original image log data.

FIG. 2A is an illustration of a diagram of an example original image log data 200. Original image log data 200 represents the geology proximate the wellbore, such as wellbore 120. Original image log data 200 can be collected using one or more various tools and sensors, for example, a density tool, a gamma tool, a resistivity tool, and an acoustic tool. In some aspects, one tool type can be used. In some aspects, more than one tool type can be used and the resulting alignment parameters computed from each of the image log data sets can be algorithmically combined to produce a final alignment parameter, for example, using an average, mode, mean, or other algorithmic function.

Image log data 200 can represent a three-dimensional (3D) view 205 of the geology proximate the wellbore. 3D view 205 can be represented by a colorization or symbolization of the image log data. 3D view 205 can be visualized as wrapping around a cylinder, i.e., the wellbore.

Figure 2B:
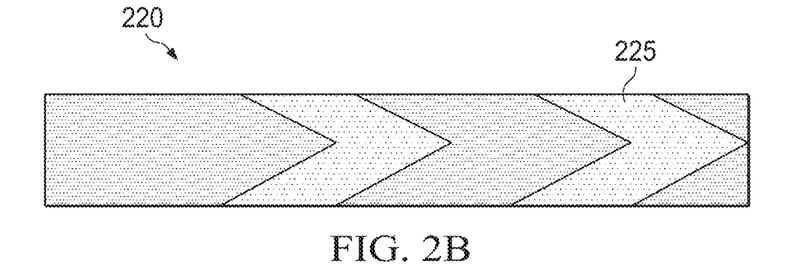
FIG. 2B is an illustration of a diagram of an example line fit of the original image log data.

FIG. 2B is an illustration of a diagram of an example line fit 220 of original image log data 200. Line fit 220 attempts to fit a line to the curves in 3D view 205, e.g., an arc/line fit, to smooth out the curves to allow for a better correlation to the geology logs. After the line fit process completes, the result is a two-dimensional (2D) view 225 of original image log data 200.

Figure 2C:
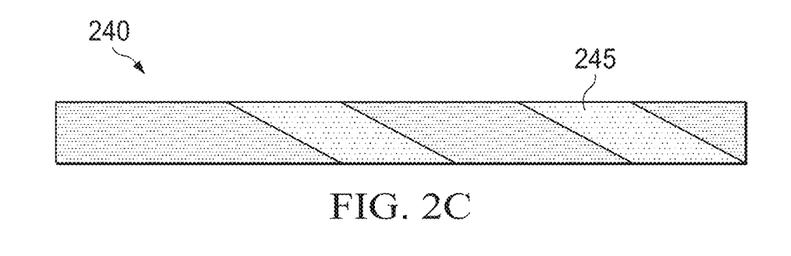
FIG. 2C is an illustration of a diagram of an example portion of image log data.

FIG. 2C is an illustration of a diagram of an example portion 240 of 2D view 225. Portion 240 corresponds to half of the 2D view 225, represented by wellbore image 245. The half view can be defined using zero degrees to 180 degrees or 180 degrees to 360 degrees, where the zero degree mark corresponds to a topmost data point, a leftmost data point, or a rightmost data point of 2D view 225. In other aspects, other degree portions can be utilized. Wellbore image 245 can have a top quadrant on top and a bottom quadrant on bottom when wellbore image 245 is plotted along the geology logs.

FIGS. 2A, 2B, and 2C are demonstrating a 2D and 3D visual color representation of the collected image log data. In some aspects, symbols can be utilized in conjunction with or instead of the color representation. In some aspects, the image log data can be manipulated and analyzed by a computing system with or without a visual representation of the image log data.

Figure 3A:
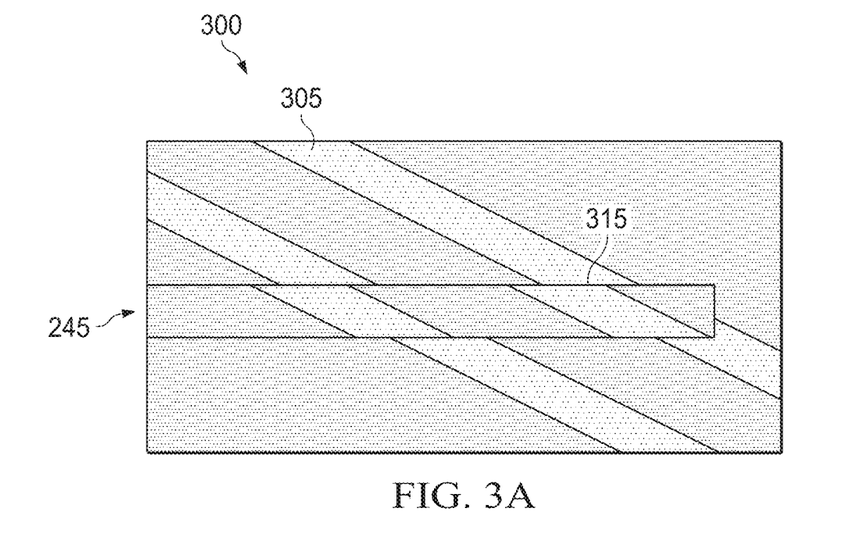
FIG. 3A is an illustration of a diagram of an example visualization of a misaligned wellbore.

FIG. 3A is an illustration of a diagram of an example visualization of a misaligned wellbore 300. Misaligned wellbore 300 shows geology logs 305, such as offset geology logs, visually represented, where the light shading stripes demonstrate a geological dip. Wellbore image 245 is overlaid geology logs 305. Wellbore image 245 shows a shift in dip alignment at location 315. Using a visualization representation, location 315 can be analyzed to determine how much the wellbore should move to bring it in alignment with geology logs 305.

Figure 3B:
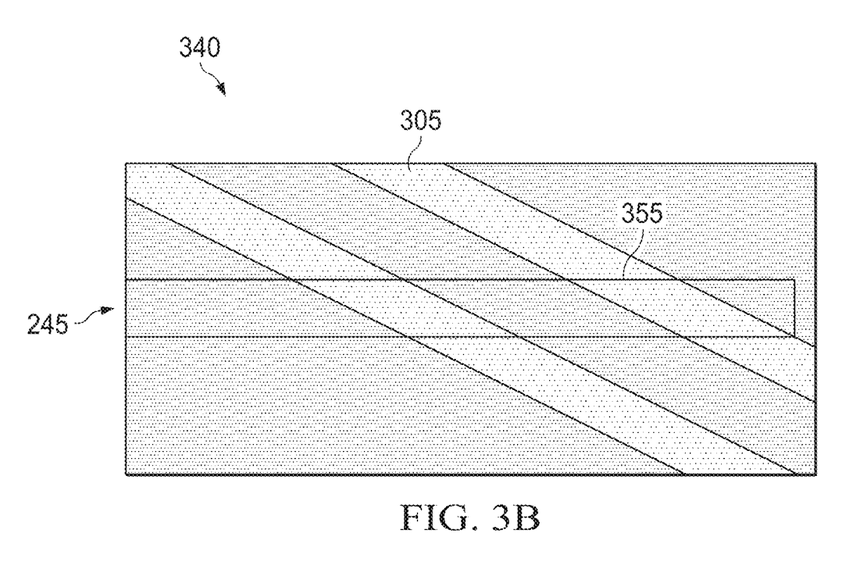
FIG. 3B is an illustration of a flow diagram of an example visualization of an aligned wellbore.

FIG. 3B is an illustration of a diagram of an example visualization of an aligned wellbore 340. Aligned wellbore 340 has adjusted geology logs 305, such as sliding geology logs 305 to align the dips as shown at location 355. In some aspects, wellbore image 245 can be adjusted and geology logs 305 can be kept constant. In the various aspects, the amount of movement performed, including linear direction, distance, tilt, angle, rotation, and other movements can be identified as an alignment parameter. The alignment parameter can be utilized as input into a geosteering process for a drilling tool, such as included with downhole tool 130 of FIG. 1.

FIGS. 3A and 3B are demonstrating a 2D visual representation of the analysis and process described herein. In some aspects, a 3D visual representation can be utilized to determine the alignment parameters. In some aspects, the analysis can be conducted by a computing system without a visual representation being generated.

Figure 4A:
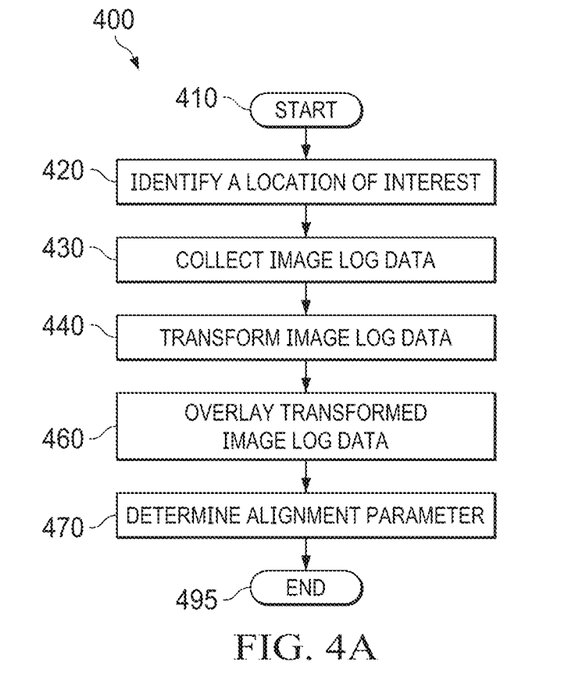
FIG. 4A is an illustration of a flow diagram of an example method to determine an alignment parameter.

FIG. 4A is an illustration of a flow diagram of an example method 400 to determine an alignment parameter. Method 400 can be performed on a computing system, such as a geosteering system, a drilling system, a well site controller, a server, a laptop, a mobile device, a cloud computing system, or other computing system capable of receiving the input parameters and outputting results. The alignment control system 500 of FIG. 5 and the geosteering controller 600 of FIG. 6 provide examples of computing systems in which at least a portion of the method 400 can be performed. Other computing systems can be a smartphone, a mobile phone, a PDA, a laptop computer, a desktop computer, a server, a data center, a cloud environment, or other computing system. The computing system can be located proximate a wellbore or can be located in a data center, a cloud environment, a lab, a corporate office, or other distant locations. Method 400 can represent an algorithm and be encapsulated in software code or in hardware, for example, an application, a code library, a dynamic link library, a module, a function, a RAM, a ROM, and other software and hardware implementations. The software can be stored in a file, database, or other computing system storage mechanism. Method 400 can be partially implemented in software and partially in hardware.

Method 400 starts at a step 410 and proceeds to a step 420. In step 420, a location of interest can be identified as an input parameter. The location is typically a point proximate the downhole tools or drilling tools located within a wellbore. As the wellbore is advanced, e.g., drilling operations are performed, a new location can be identified. Method 400 can be performed at intervals of advancement of the drilling tools in the wellbore, such as every four to ten centimeters, or other distance amounts. Other distance or time intervals can be utilized as well.

Proceeding to a step 430, at the identified location, an azimuthal image log data set can be collected, as additional input parameters, using a downhole tool or sensor. In some aspects, more than one image log data set can be collected using different downhole tools or sensors. In some aspects, the image log data can be transmitted to surface equipment, for example, a well site controller. In some aspects, the process and analysis can be performed by a computing system located downhole, such as proximate the downhole tools and sensors.

Proceeding to step 440, the image log data can be transformed to align with the geology logs, such as offset geology logs. The transformation can be to transform the collected 3D image log data set into a 2D image log data set while straightening curves using an arc/line fit algorithm. Other transforms can be performed as well, such as angle, tilt, rotation, and other movements to orient the geology logs with the image log data set, e.g., a linear movement, a tilt movement, a rotation movement, a slide movement, or an angle movement.

Proceeding to a step 460, the transformed image log data can be reduced by selecting a half of the data. The half of the data can be overlaid the geology logs in a 2D representation. For example, the alignment can utilize a top half of the image log data to align with a top quadrant of the geology logs, and a bottom half of the image log data to align with a bottom quadrant of the geology logs. The half can be, for example zero degrees to 180 degrees of the original 3D data, or 180 degrees to 360 degrees of the original 3D data. Other degree portions of the original 3D data can be utilized as well.

Proceeding to a step 470, the geology logs or the transformed image log data can be moved against the other to determine an amount of movement identified as the alignment parameter. The alignment parameter can be used as input into a geosteering process. Method 400 ends at a step 495.

Figure 4B:
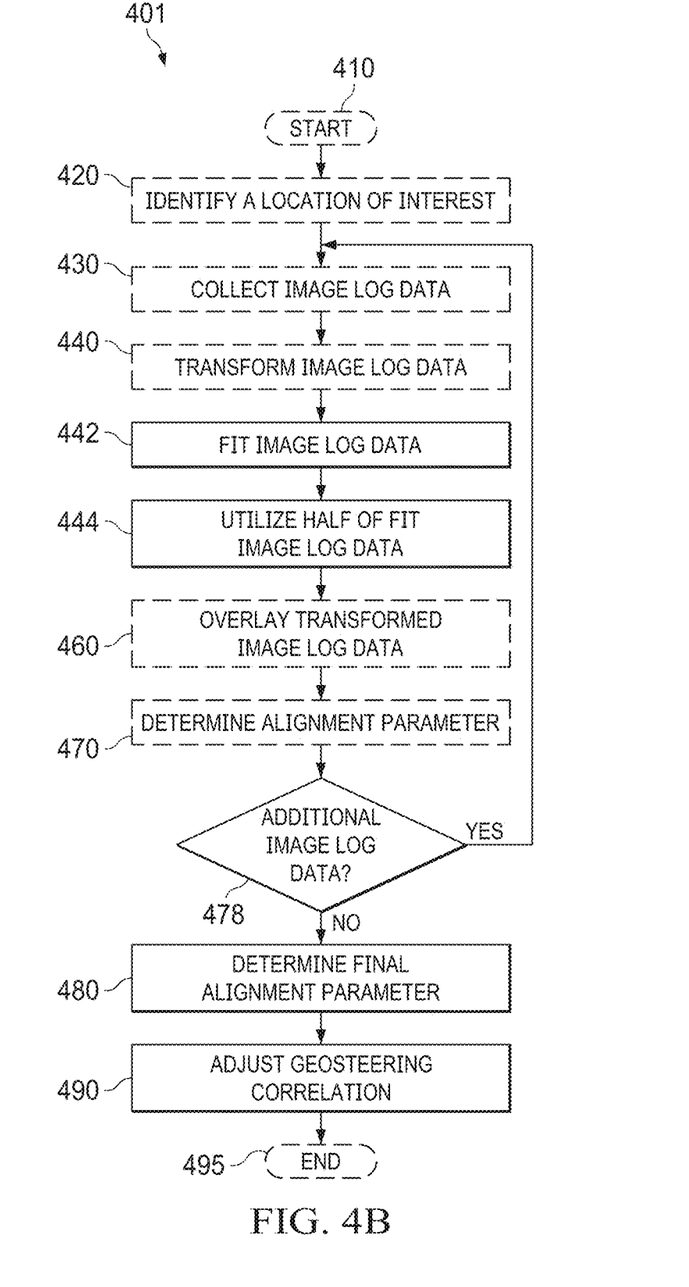
FIG. 4B is an illustration of a flow diagram of an example method, building on FIG. 4A, to determine a final alignment parameter.

FIG. 4B is an illustration of a flow diagram of an example method 401, building on FIG. 4A, to determine a final alignment parameter. The steps of method 400 are shown with dashed lines and new steps of method 401 are shown with solid lines. The steps of method 400 perform the actions as described above, except as noted below.

Method 401 starts at step 410 and proceeds to step 420, step 430, and step 440. Step 440 is further detailed in a step 442 where the 3D image log data set is fitted to a 2D image log data set where the fitting process utilizes an arc/line fit algorithm to remove curves. Proceeding to a step 444, half of the transformed image log data set is selected. The half utilized can be selected such that a first top portion of the transformed image log data set is aligned with a second top portion of the geology logs, and a first bottom portion of the transformed image log data set is aligned with a second bottom portion of the geology logs.

Method 401 proceeds to step 460 where the transformed image log data is overlaid on the geology logs to enable a comparison and adjustment calculation. Proceeding to a step 470, an alignment parameter can be determined from the comparison of the overlaid transformed image log data set and the geology logs.

Proceeding to a decision step 478, if additional image log data sets are available, such as if collected by more than one downhole tool or sensor, method 401 proceeds to step 430 and utilizes one of the additional image log data sets. In some aspects, the more than one downhole tool or sensor can be a different downhole tool or sensor. If there are no other image log data sets that have not yet been processed, method 401 proceeds to a step 480. In step 480, if there are more than one determined alignment parameter, the alignment parameters can be algorithmically combined, such as using averaging or other algorithms. The resultant can be designated as the final alignment parameter. If there is one determined alignment parameter, that parameter can be designated as the final alignment parameter.

In a step 490, the alignment parameter can be transmitted to another process, system, tool, device, or other mechanism and utilized as an input to adjust geosteering correlations, such as in a geosteering process or system. Method 401 ends at step 495.

Figure 5:
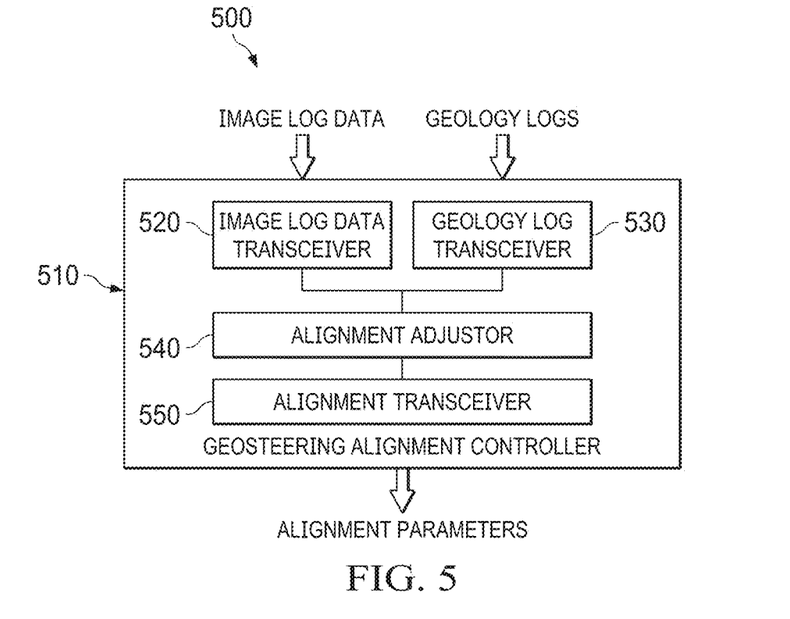
FIG. 5 is an illustration of a block diagram of an example alignment control system.
Figure 6:
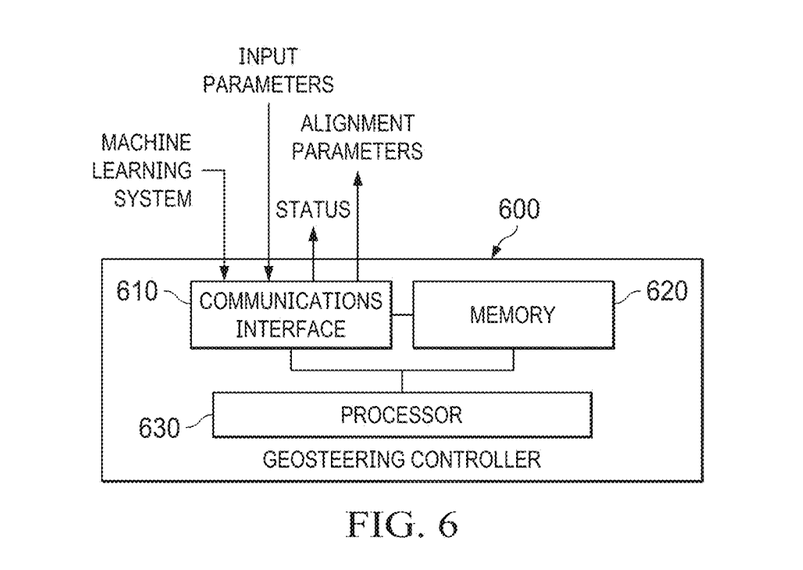
FIG. 6 is an illustration of a block diagram of an example of a geosteering controller according to the principles of the disclosure.

FIG. 5 is an illustration of a block diagram of an example alignment control system 500, which can be implemented in one or more computing systems, for example, a well site controller, a reservoir controller, a data center, cloud environment, server, laptop, smartphone, tablet, and other computing systems. The computing system can include one or more processors, one or more memory (data storage), and one or more interface for communicating data. The computing system can be located proximate the well site, or a distance from the well site, such as in a data center, cloud environment, or corporate location. Alignment control system 500 can be implemented as an application, a code library, dynamic link library, function, module, other software implementation, or combinations thereof. In some aspects, alignment control system 500 can be implemented in hardware, such as a ROM, a graphics processing unit, or other hardware implementation. In some aspects, alignment control system 500 can be implemented partially as a software application and partially as a hardware implementation. In some aspects, alignment control system 500 can be implemented using a geosteering controller such as geosteering controller 600 of FIG. 6.

Alignment control system 500 includes a geosteering alignment controller 510 which further includes an image log data transceiver 520, a geology log transceiver 530, an alignment adjustor 540, and an alignment transceiver 550. Image log data transceiver 520 can receive image log data as input parameters, such as azimuthal image log data from one or more downhole tools and sensors, for example, from a resistivity tool, a density tool, a gamma tool, and an acoustic tool, e.g., where different downhole tools or sensors are utilized. Image log data transceiver 520 can also receive input parameters relating to alignment parameters, such as an error threshold, adjustments to measured depths, a targeted distance from a geological feature such as a dip, and a type of algorithm to utilize when more than one set of image log data is available. The error threshold can be used, for example, to determine a point where the projected wellbore diverges more than the error threshold from the geology logs which indicates that an alignment parameter should be used to reduce the divergence.

Geology log transceiver 530 can receive geology logs as input parameters, such as offset logs, lithology models, and other geological data that describe the subterranean formation. The received geology logs can be received from a data source, such as a database, data file, user input, a well site controller, a reservoir controller, or other data source.

Alignment transceiver 550 can communicate one or more determined alignment parameters and final alignment parameters to another system, such as a geosteering system, a geosteering controller, a well site controller, a computing system, or other well related system. The other well related system can be included in the computing system where alignment control system 500 is executing or be located in another computing system proximate or distance from alignment control system 500. Image log data transceiver 520, geology log transceiver 530, and alignment transceiver 550 can be, or can include, conventional interfaces configured for transmitting and receiving data.

Alignment adjustor 540 can implement the analysis, equations, and algorithms as described herein utilizing the image log data, geology logs, and other input parameters to determine the alignment parameters. Alignment adjustor 540 can transform the image log data to match an orientation of the geology logs, including transforming data from a 3D representation to a 2D representation and fitting a straight line to arcs in the image log data. The determining of the alignment parameter can include comparing the image log data to the geology logs and then moving one of the logs against the other to create an approximate alignment. The movement can be in various directions and be linear, angled, tilted, slide, or rotated, where the movement is represented by the determined alignment parameter or final alignment parameter.

If there is more than one image log data set for a location, alignment adjustor 540 can algorithmically combine the two or more alignment parameters as a final alignment parameter using various algorithms, such as averaging. Alignment adjustor 540 can perform the operations described herein or can perform a portion of the operations, such as when a user can review a 2D or 3D representation of the various data and logs to manually adjust one of the logs to determine the alignment parameter. In some aspects, a user can toggle additional data overlays, such as overlaying received survey parameters, received drilling bit parameters, received wellbore projection parameters, and one or more additional image log data sets.

Alignment adjustor 540 can operate in serial or parallel computation mode such that analysis can be conducted on more than one image log data set at a time allowing the overall processing time to be reduced. Alignment adjustor 540 can be implemented on a processor configured to calculate the alignment parameters as disclosed herein. A memory or data storage of alignment adjustor 540 or geosteering alignment controller 510 can be configured to store the processes and algorithms for directing the operation of alignment adjustor 540. Alignment control system 500 is a functional view of the process and methods, where an implementation can utilize various combinations of the functions, for example, image log data transceiver 520 and geology log transceiver 530 can be combined into one transceiver, or an additional transceiver can be present to receive other input parameters.

FIG. 6 is an illustration of a block diagram of an example of geosteering controller 600 according to the principles of the disclosure. Geosteering controller 600 can be stored on a single computer or on multiple computers. The various components of geosteering controller 600 can communicate via wireless or wired conventional connections. A portion or a whole of geosteering controller 600 can be located downhole at one or more locations and other portions of geosteering controller 600 can be located on a computing device or devices located at the surface or a distant location from the borehole. In some aspects, geosteering controller 600 can be wholly located at a surface or distant location. In some aspects, geosteering controller 600 is part of a geosteering system, and can be integrated in a single device.

Geosteering controller 600 can be configured to perform the various functions disclosed herein including receiving input parameters, such as the location of interest and one or more azimuthal image log data sets, and generating one or more alignment parameters from an execution of the methods and processes described herein. Geosteering controller 600 includes a communications interface 610, a memory 620, and a processor 630.

Communications interface 610 is configured to transmit and receive data. For example, communications interface 610 can receive the input parameters. Communications interface 610 can transmit the various alignment parameters and other generated results. In some aspects, communications interface 610 can transmit a status, such as a success or failure indicator of geosteering controller 600 regarding receiving the input parameters, transmitting the alignment parameters, or generating the alignment parameters. In some aspects, communications interface 610 can receive input parameters from a machine learning system, such as when the azimuthal image log data set or geology logs are analyzed by a machine learning algorithm prior to being utilized as an input into the described processes and methods. Communications interface 610 can communicate via communication systems used in the industry. For example, wireless or wired protocols can be used. Communication interface 610 is capable of performing the operations as described for image log data transceiver 520, geology log transceiver 530, and alignment transceiver 550.

Memory 620 can be configured to store a series of operating instructions that direct the operation of processor 630 when initiated, including the code representing the algorithms for determining the alignment parameters. Memory 620 is a non-transitory computer readable medium. Multiple types of memory can be used for data storage and memory 620 can be distributed.

Processor 630 can be configured to generate the determined alignment parameters, the final alignment parameters, and statuses utilizing the received input parameters, and, if provided, the machine learning system inputs. For example, processor 630 can perform an analysis of the azimuthal image log data and the geology logs to determine an alignment parameter. Processor 630 can be configured to direct the operation of the geosteering controller 600. Processor 630 includes the logic to communicate with communications interface 610 and memory 620, and perform the functions described herein to determine the alignment parameters and statuses. Processor 630 is capable of performing or directing the operations as described by geosteering alignment controller 510.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magnetooptical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

As indicated in the Summary, the disclosure provides various aspects, each which can have one or more of the following additional elements in combination. Element 1: adjusting a geosteering system of the wellbore, utilizing the alignment parameter. Element 2: wherein the transforming further comprises fitting the initial image log data set to a 2D representation. Element 3: wherein the 2D representation utilizes an arc/line fit algorithm to remove curves. Element 4: wherein the overlaying further comprises utilizing a half of the transformed image log data set. Element 5: wherein a first top portion of the transformed image log data set is aligned with a second top portion of the geology logs, and a first bottom portion of the transformed image log data set is aligned with a second bottom portion of the geology logs. Element 6: wherein the half of the transformed image log data set is derived from a portion of the initial image log data set representing an arc from zero degrees to 180 degrees or 180 degrees to 360 degrees. Element 7: wherein a zero degree mark of the initial image log data set is one of a topmost data point, a leftmost data point, or a rightmost data point. Element 8: wherein the location is at a change in a dip. Element 9: where the dip is part of the subterranean formation. Element 10: wherein the geology logs are offset geology logs. Element 11: wherein the determining performs one of adjusting the overlaid image log data set and maintaining the geology logs constant, or adjusting the geology logs and maintaining constant the overlaid image log data set. Element 12: wherein the alignment parameter represents a movement to align the geology logs and the overlaid image log data set. Element 13: wherein the movement is one or more of a tilt movement, a rotation movement, an angle movement, or a linear movement in one or more directions. Element 14: wherein the geology logs and the initial image log data set are represented by one or more of a colorization of the subterranean formation, or a symbolization of the subterranean formation. Element 15: wherein the initial image data set is more than one initial image log data set. Element 16: wherein each initial image log data set is collected utilizing a different downhole measuring tool. Element 17: wherein a final alignment parameter is an average of each alignment parameter using each respective initial image log data set. Element 18: wherein the location is more than one location in the wellbore and the collecting, transforming, overlaying, and determining are performed for each location.

What is claimed is:

1. A method, comprising:
   identifying a location at which a wellbore is compared to geology logs, wherein the location is in a subterranean formation of the wellbore;
   collecting an initial image log data set, wherein the initial image log data set represents a three-dimensional (3D) image proximate the wellbore at the location;
   transforming the initial image log data set to match an orientation of the geology logs, to generate a transformed image log data set;
   overlaying the transformed image log data set on the geology logs to generate an overlaid image log data set, wherein a first top portion of the transformed image log data set is aligned with a second top portion of the geology logs forming a first half image log data, and a first bottom portion of the transformed image log data set is aligned with a second bottom portion of the geology logs forming a second half image log data; and
   determining an alignment parameter, wherein the geology logs or the overlaid image log data set is adjusted.

2. The method as recited in claim 1, further comprising: adjusting a geosteering system of the wellbore, utilizing the alignment parameter.

3. The method as recited in claim 1, wherein the transforming further comprises:
   fitting the initial image log data set to a two-dimensional (2D) representation, wherein the 2D representation utilizes an arc/line fit algorithm to remove curves.

4. The method as recited in claim 1, wherein the first half image log data is derived from a portion of the initial image log data set representing an arc from zero degrees to 180 degrees or 180 degrees to 360 degrees.

5. The method as recited in claim 4, wherein a zero degree mark of the initial image log data set is one of a topmost data point, a leftmost data point, or a rightmost data point.

6. The method as recited in claim 1, wherein the location is at a change in a dip, where the dip is part of the subterranean formation.

7. The method as recited in claim 1, wherein the geology logs are offset geology logs.

8. The method as recited in claim 1, wherein the determining performs one of adjusting the overlaid image log data set and maintaining the geology logs constant, or adjusting the geology logs and maintaining constant the overlaid image log data set.

9. The method as recited in claim 1, wherein the alignment parameter represents a movement to align the geology logs and the overlaid image log data set, wherein the movement is one or more of a tilt movement, a rotation movement, an angle movement, or a linear movement in one or more directions.

10. The method as recited in claim 1, wherein the geology logs and the initial image log data set are represented by one or more of a colorization of the subterranean formation, or a symbolization of the subterranean formation.

11. The method as recited in claim 1, wherein the initial image data set is more than one initial image log data set, wherein each initial image log data set is collected utilizing a different downhole measuring tool, and a final alignment parameter is an average of each alignment parameter using each respective initial image log data set.

12. The method as recited in claim 1, wherein the location is more than one location in the wellbore and the collecting, transforming, overlaying, and determining are performed for each location.

13. A system, comprising:
   an image log data transceiver, capable of receiving input parameters and one or more image log data sets for a location proximate a wellbore, wherein the location is a part of a subterranean formation;
   a geology log transceiver, capable of receiving one or more geology logs for the location; and
   an alignment adjustor, capable of utilizing the input parameters, the one or more image log data sets, and the one or more geology logs to calculate one or more alignment parameters, wherein the one or more image log data sets are transformed to match an orientation of the one or more geology logs to form a transformed image log data set, and the one or more image log data sets are compared to the respective of the one or more geology logs to calculate the one or more alignment parameters, wherein a first top portion of the transformed image log data set is aligned with a second top portion of the geology logs forming a first half image log data, and a first bottom portion of the transformed image log data set is aligned with a second bottom portion of the geology logs forming a second half image log data.

14. The system as recited in claim 13, wherein the alignment adjustor can utilize a three-dimensional (3D) or a two-dimensional (2D) representation of the one or more image log data sets and the one or more geology logs.

15. The system as recited in claim 14, wherein the 2D representation is utilized and the alignment adjustor is further capable of fitting a line data representation over a 3D arc data representation of the one or more image log data sets.

16. The system as recited in claim 13, wherein the one or more alignment parameters represent a movement, wherein the movement is one or more of a tilt movement, a rotation movement, a slide movement, an angle movement, or a linear movement.

17. The system as recited in claim 13, wherein one or more of a user, a well site controller, a geosteering controller, or a computing system is capable of receiving the one or more alignment parameters.

18. The system as recited in claim 13, wherein the alignment adjustor is further capable of utilizing a colorization or a symbolization of the one or more image log data sets and the geology logs.

19. The system as recited in claim 13, wherein the alignment adjustor is further capable to overlay received survey parameters, received drilling bit parameters, received wellbore projection parameters, or one or more of the one or more image log data sets.

20. The system as recited in claim 13, wherein each of the one or more image log data sets is received from a different downhole tool, and wherein the downhole tool is one of a density tool, a gamma tool, a resistivity tool, or an acoustic tool.

21. A computer program product having a series of operating instructions stored on a non-transitory computer-readable medium that directs a data processing apparatus when executed thereby to perform operations to determine an alignment parameter, the operations comprising:
   identifying a location at which a wellbore is compared to geology logs, wherein the location is in a subterranean formation of the wellbore;
   collecting an initial image log data set, wherein the initial image log data set represents a three-dimensional (3D) image proximate the wellbore at the location;
   transforming the initial image log data set to match an orientation of the geology logs to generate a transformed image log data set;
   overlaying the transformed image log data set to the geology logs to generate an overlaid image log data set, wherein a first top portion of the transformed image log data set is aligned with a second top portion of the geology logs forming a first half image log data, and a first bottom portion of the transformed image log data set is aligned with a second bottom portion of the geology logs forming a second half image log data; and
   determining an alignment parameter, wherein the geology logs or the overlaid image log data set is adjusted.

* * * * *